(12) United States Patent
Singer et al.

(10) Patent No.: US 10,108,923 B2
(45) Date of Patent: Oct. 23, 2018

(54) METHOD AND SYSTEM FOR INVENTORY DATA SHARING BETWEEN AIRLINES

(75) Inventors: Joel Singer, Antibes (FR); Roman Rubsamen, Vidauban (FR)

(73) Assignee: AMADEUS S.A.S., Biot (FR)

( * ) Notice: Subject to any disclaimer, the term of this patent is extended or adjusted under 35 U.S.C. 154(b) by 1467 days.

(21) Appl. No.: 12/789,349

(22) Filed: May 27, 2010

(65) Prior Publication Data

US 2011/0251863 A1 Oct. 13, 2011

(30) Foreign Application Priority Data

Apr. 13, 2010 (EP) .................................... 10305384

(51) Int. Cl.
*G06Q 10/00* (2012.01)
*G06Q 10/08* (2012.01)
*G06Q 10/02* (2012.01)

(52) U.S. Cl.
CPC .......... *G06Q 10/087* (2013.01); *G06Q 10/02* (2013.01); *G06Q 10/025* (2013.01)

(58) Field of Classification Search
None
See application file for complete search history.

(56) References Cited

U.S. PATENT DOCUMENTS

| | | | |
|---|---|---|---|
| 6,868,444 B1 * | 3/2005 | Kim et al. | 709/223 |
| 8,078,483 B1 * | 12/2011 | Hirose et al. | 705/5 |
| 2002/0147767 A1 | 10/2002 | Brice et al. | |
| 2007/0185745 A1 * | 8/2007 | Schukraft | 705/5 |

OTHER PUBLICATIONS http://en.wikipedia.org/wiki/Two-phase_commit_protocol (Downloaded from the Internet Jul. 13, 2010).
Extended European Search Report for European Application No. 10305384.9 (dated Sep. 15, 2010).
"Notice from the European Patent Office dated Oct. 1, 2007 concerning business methods," Official Journal EPO, pp. 592-593 (Nov. 2007).

* cited by examiner

*Primary Examiner* — Tonya Joseph
(74) *Attorney, Agent, or Firm* — Thompson Hine LLP

(57) ABSTRACT

The method according to a preferred embodiment of the present invention allows a single computerized Inventory system to access multiple sources of Inventory data for different airlines in real-time; without a performance hit on the inventory system; without needing specific interfaces to be put in place; and without needing duplication of data. A customer request requiring inventory data from some other airlines is detected on the airline Inventory system. For each other airline involved in the action that has been detected, a component holding access rules is queried to check whether the airline has the permission to access the other airline inventory data, and the precise data to which it has access. For each other airline involved in the action that has been detected and for which the airline has the permission to access inventory data, the airline Inventory system connects to the other airline partition, retrieve the required current other airline inventory data, and disconnects from the other airline partition. The action that has previously been detected is finally processed, taking into account all the other airline inventory data.

19 Claims, 9 Drawing Sheets

METHOD AND SYSTEM FOR INVENTORY DATA SHARING BETWEEN AIRLINES

PRIORITY CLAIM

This application claims the benefit of European patent application no. 10305384.9 filed Apr. 13, 2010, the disclosure of which is incorporated herein by reference in its entirety.

FIELD OF THE INVENTION

The present invention relates to the field of management of inventory data, particularly to a method and system for real time inventory data sharing between airlines, possibly belonging to an alliance.

BACKGROUND OF THE INVENTION

Modern airlines inventory systems, usually employ complex calculation algorithms for monitoring and managing g up-to-date flights availability. It is more and more usual that a number of independent airlines group together to form an Alliance which could better exploit the different geographical and network capabilities of the single airlines. When such alliances have an interconnected inventory system, the calculation algorithms need to access data from multiple airlines and often from multiple data base systems. According to existing techniques, when the Inventory system of an airline requires inventory data from another airline belonging to the same Airline Alliance, this inventory data are usually accessed in one of the following alternative ways:
  remotely, the Inventory system of the other airline being directly accessed in real-time, thanks to dedicated interfaces;
  locally, the Inventory system of the other airline regularly pushing its inventory data to the Inventory system of the airline, enabling the latter to replicate required inventory data.

Both solutions have drawbacks. The first approach requires the Inventory system of the other airline to publish interfaces for accessing inventory data and to be able to cope with the amount of traffic induced. It also makes the Inventory system of the airline dependant on the Inventory system of the other airline, impeding its performances and actually preventing a true real-time usage of the other airline inventory data (network latency to reach the Inventory system of the other airline, processing time of the Inventory system of the other airline to take into account, . . . ).

The second approach requires the Inventory system of the other airline to develop interfaces for exporting inventory data. It also requires the Inventory system of the airline to import the inventory data of the other airline, and completely exclude any possibility of a real-time access to this data.

In both cases, a real-time access to the inventory data of the other airline is actually impossible, implying for instance that availability computed taking into account the other airline inventory data might not be accurate.

Patent application US-A 2002/0147767 discloses a method for monitoring another party's (in this case a competitor's) inventory data by duplicating data on a temporary storage. Such duplication involves the risk that currently accessed data are not up to date with the actual data in the main (original) data base, thus causing possible inconsistency of data, which is not acceptable to the customers.

OBJECT OF THE INVENTION

An object of the present invention is to alleviate at least some of the problems associated with the prior art systems.

According to one aspect of the present invention there is provided a method for handling, in a client server system, a plurality of flight inventory data bases, each inventory data base belonging to one of a plurality of airlines, a reservation client module of each airline of the plurality of airlines being authorised to access at least a partition of at least one of the flight inventory data base of another airline of the plurality of airlines, the method including the steps of: a server maintaining a repository of a plurality of access rules defining which portion of data of each of the plurality of flight inventory data bases can be accessed by each of the plurality of airlines reservation client modules; the server receiving by a reservation client module of a first of the plurality of airlines a customer request including the need to access a flight inventory data base of a second of the plurality of airlines; the server verifying on the repository whether the reservation client module of the first airline has the authorisation for accessing the portion of data of the flight inventory data base of the second airline which is necessary to satisfy the customer request; responsive to the authorisation being confirmed, the server allowing the first airline reservation client module to access the portion of data on the second airline flight inventory data base.

The method according to a preferred embodiment of the present invention allows a single computerized Inventory system to access multiple sources of Inventory data for different airlines in real-time; without a performance hit on the inventory system; without needing specific interfaces to be put in place; and without needing duplication of data.

The subject matter described herein can be implemented using the non-transitory computer readable medium having stored thereon executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein can be implemented on a single device or computing platform or may be distributed across plural devices or computing platforms.

According to a second aspect of the present invention there is provided a system comprising one or more components adapted to perform the method described above.

According to a further embodiment of the present invention there is provided a computer program comprising instructions for carrying out the method described above when said computer program is executed on a computer system.

BRIEF DESCRIPTION OF DRAWINGS

Reference will now be made, by way of example, to the accompanying drawings, in which:

FIG. 5a shows the processing of a customer request according to the current airline industry practice, while

DETAILED DESCRIPTION OF THE EMBODIMENTS

Figure 1:
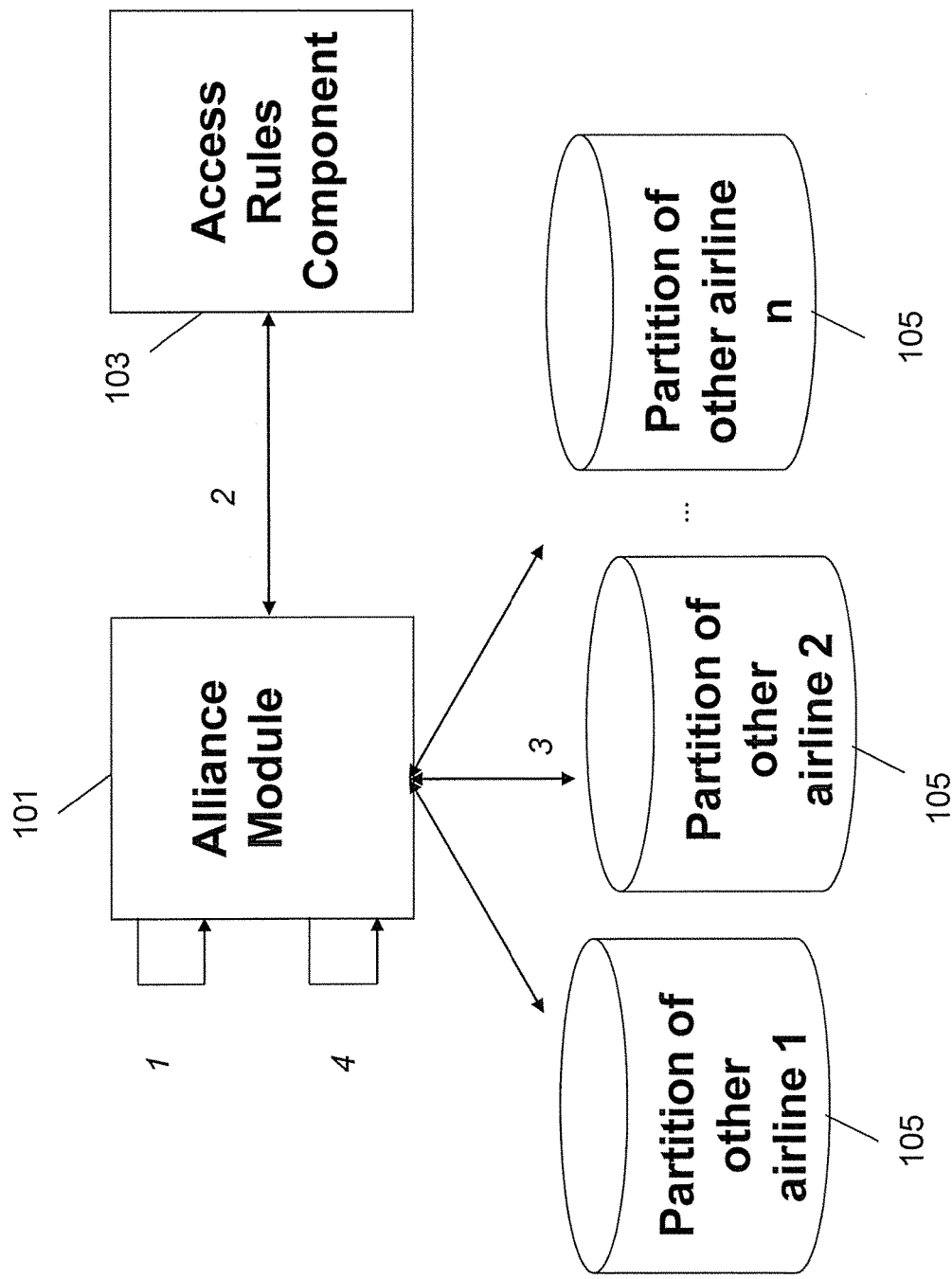
FIG. 1 is a diagram of the inventory system in accordance with one embodiment of the present invention.

FIG. 1 shows an inventory system suitable to implement the method and system according to a preferred embodiment of the present invention. An Alliance module 101 is connected to an Access Rule Component module 103 where all the rules for accessing the information on the various partitions are stored. When a request is received by the Alliance Module 101, the Access Rules Component module 103 is queried to verify whether that kind of information is available to the requesting party. According to such authorisation and to the information needed (i.e. the flight portion of interest), the Alliance Module navigates the partitions 105 to obtain the requested information. According to a preferred embodiment of the present invention the main airline Inventory system and the other airlines Inventory systems are hosted under the same Inventory platform.

Amadeus Altéa Inventory (Plan) Release 6.7 of Amadeus IT Group SA is an example of such a community Inventory platform wherein a method according to a preferred embodiment of the present invention can be implemented. The inventory system according to a preferred embodiment of the present invention is organised according to a client/server architecture, wherein the Alliance Module server receives customer requests by a plurality of client modules, each client module acting on behalf of one of the airlines belonging to an airlines Alliance.

When an action on the airline Inventory requires inventory data from other airlines belonging to the same Alliance, the system will, for each other airline taking part in this action:

check if the other airline has granted the airline access to this inventory data, using the access rules component;
if so, connect to the partition of the Inventory system holding the other airline inventory data, fetch current required inventory information and disconnect from the partition.

One of the main aspect of the method according to a preferred embodiment of the present invention is the real-time access to the inventory: with the system architecture described above, when an availability request/sell request, or more generally when any activity that requires accessing another airline data takes place for an airline, the data that is accessed (if the other airline is hosted by the common Inventory platform, and if the other airline granted the permission to use this data) is exactly the same than the data that would be accessed by the other airline itself. For instance, this implies that as soon as there is only one remaining seat in business class on a given other airline flight, this information is known by the airline, and can be taken into account if an activity making use of this information takes place. Similarly, the airline does not need to wait for a notification, or for data put in a temporary storage to be processed.

Once all other airlines inventory data is collected, the action on the airline Inventory is resumed, using this data.

Each airline is responsible for granting or refusing the permission to access their inventory data. This can be done e.g. through a graphical user interface, accessible to every airlines hosted on the Inventory system. Other airlines can define which data and/or range of data they give access to which airline. Modifications validated via this graphical user interface are taken into account by the Inventory system immediately. One of the advantages of the method and system according to the present invention is the possibility of easily modifying and updating the authorisations of each airline on other airlines data bases or data bases partitions: it is enough to amend the access rules in a centralized repository. This allows a dynamic management of the interactions between airlines which can vary according to several parameters or events (e.g. time, advanced reservations, traffic conditions, reciprocal agreements).

For performance reasons, connection to the partition of the Inventory system holding other airline inventory data might not be possible on demand (for instance, in case the partition is a database, connecting and disconnecting from it is a costly operation); thus, a mechanism can be used to have all the necessary partitions ready for use at any time.

Always with reference to FIG. 1, numerals from 1 to 4 indicates the various activities (or groups of activities) and the modules which are interested by those activities, according to a preferred embodiment of the present invention. In particular:

1) An action on an airline requiring inventory data from some other airlines is detected by the Alliance Module.
2) For each other airline involved in the action that has been detected, a component holding access rules is queried to check whether the airline has the permission to access the other airline inventory data, and the precise data to which it has access.
3) For each other airline involved in the action that has been detected and for which the airline has the permission to access inventory data, the airline Alliance Module connects to the other airline database partition, retrieve the required current other airline inventory data, and disconnects from the other airline database partition.
4) The action that has previously been detected is finally processed, taking into account the other airline inventory data.

Figure 2:
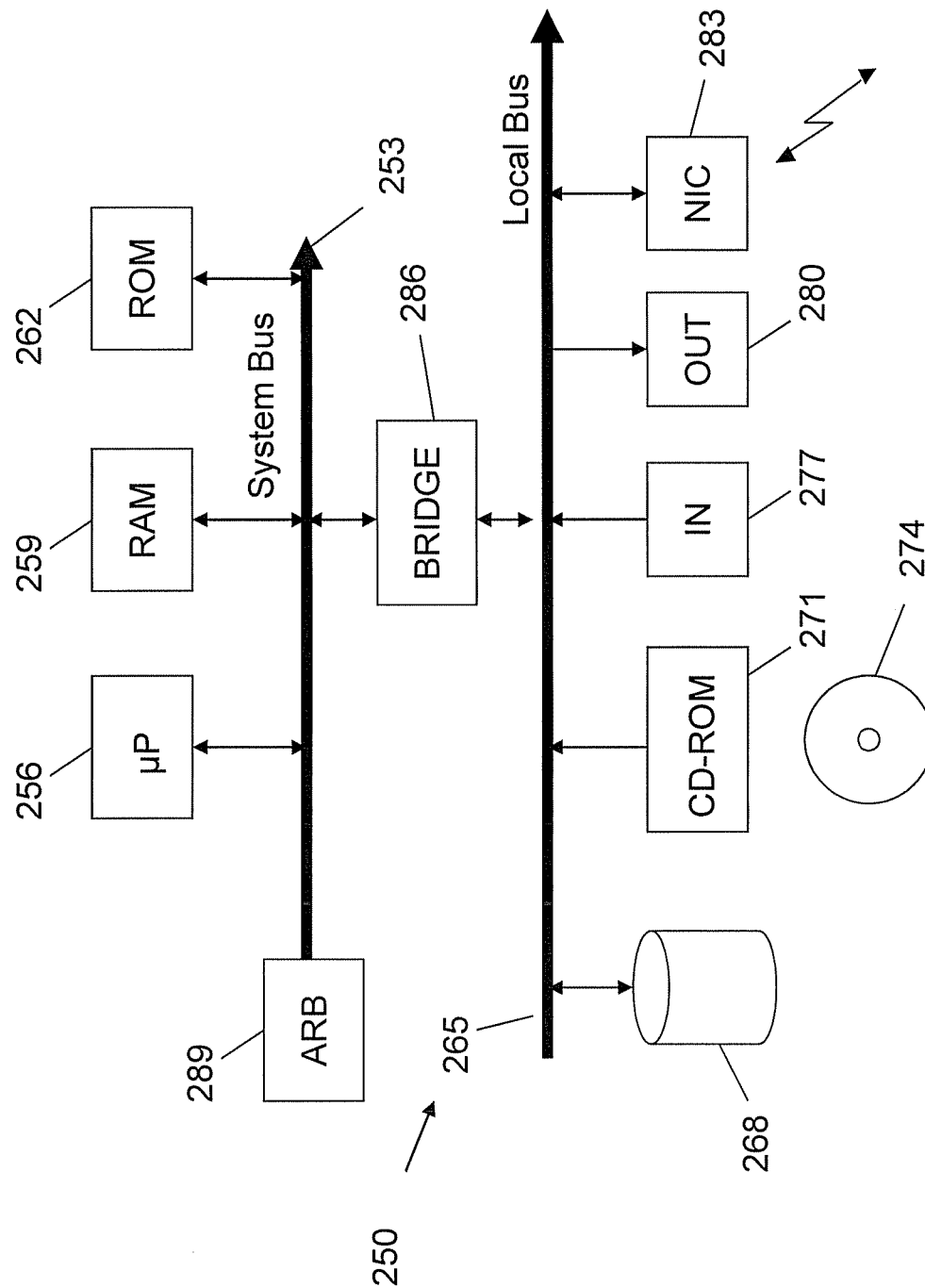
FIG. 2 is a diagram of a general computer system adapted to support the method of a preferred embodiment of the present invention.

With reference to FIG. 2 a generic computer of the system (e.g. computer, Alliance module server, data base management subsystem, router, network server) is denoted with 250. The computer 250 is formed by several units that are connected in parallel to a system bus 253. In detail, one or more microprocessors 256 control operation of the computer 250; a RAM 259 is directly used as a working memory by the microprocessors 256, and a ROM 262 stores basic code for a bootstrap of the computer 250. Peripheral units are clustered around a local bus 265 (by means of respective interfaces). Particularly, a mass memory consists of a hard-disk 268 and a drive 271 for reading CD-ROMs 274. Moreover, the computer 250 includes input devices 277 (for example, a keyboard and a mouse), and output devices 280 (for example, a monitor and a printer). A Network Interface Card 283 is used to connect the computer 250 to the network. A bridge unit 286 interfaces the system bus 253 with the local bus 265. Each microprocessor 256 and the bridge unit 286 can operate as master agents requesting an access to the system bus 253 for transmitting information. An arbiter 289 manages the granting of the access with mutual exclusion to the system bus 253. Similar considerations apply if the system has a different topology, or it is based on other networks. Alternatively, the computers have a different structure, include equivalent units, or consist of other data processing entities (such as PDAs, mobile phones, and the like).

Figure 3A:
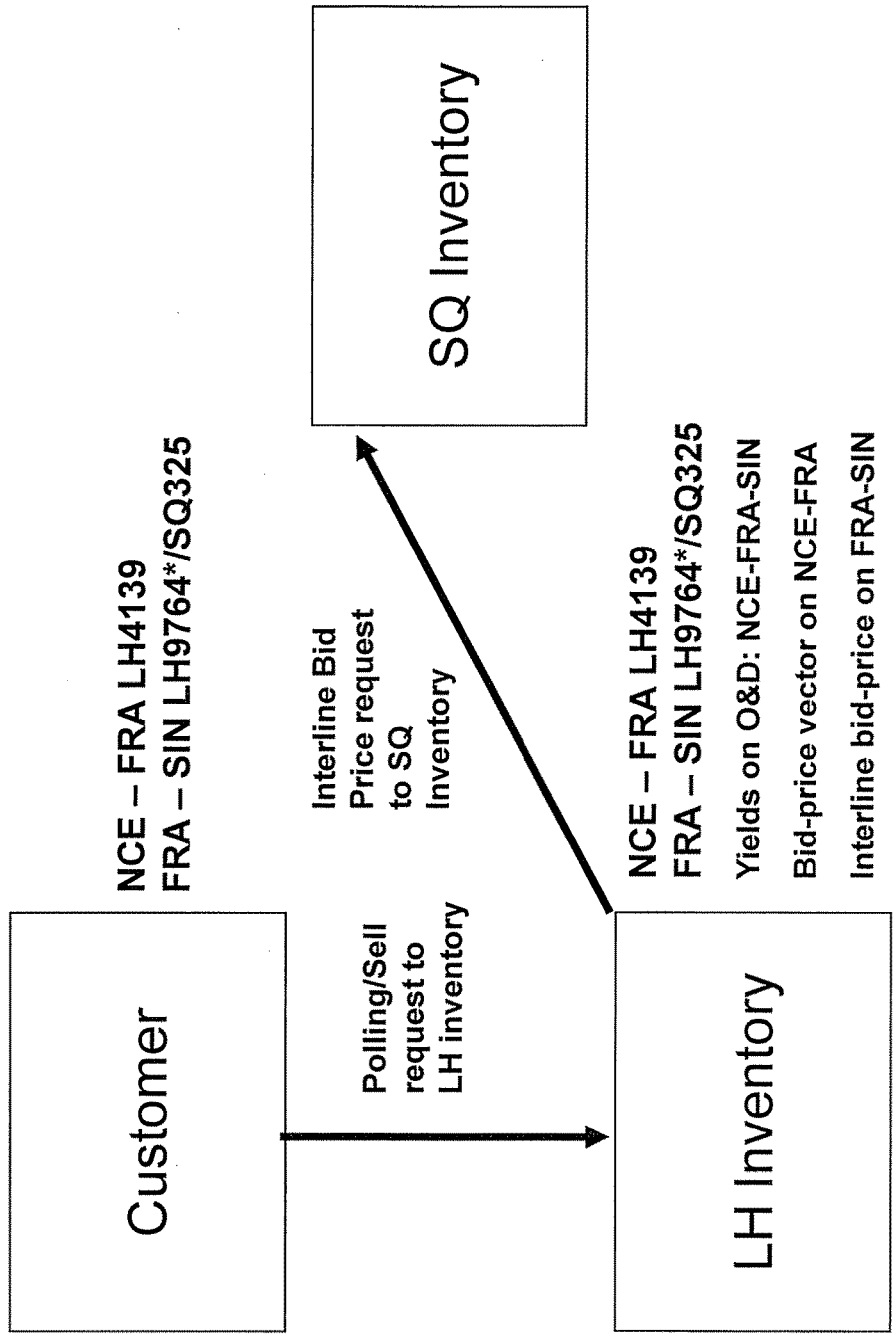
FIGS. 3a, 3b and 4 are examples of possible customer requests received by a reservation server.
Figure 3B:
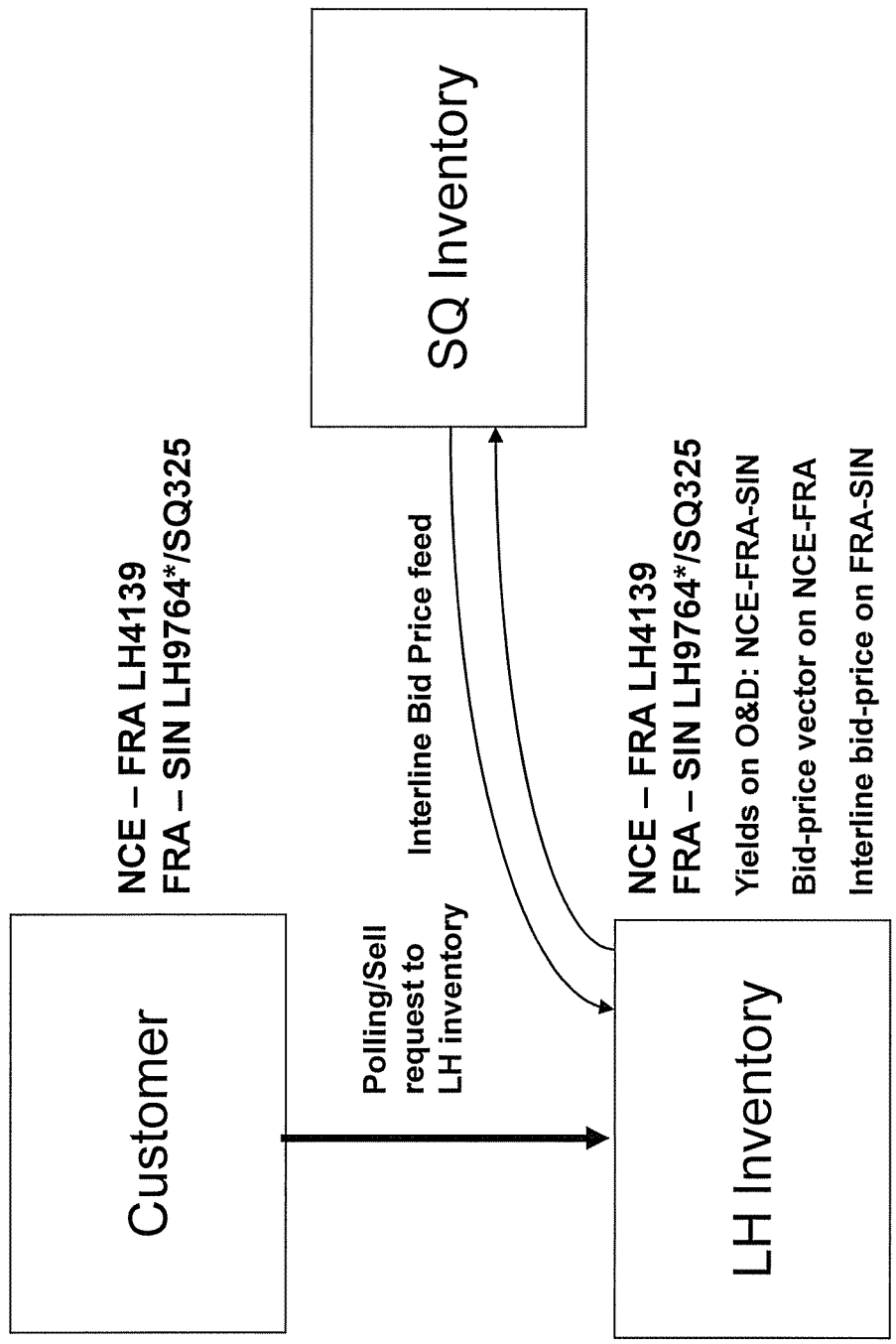
Figure 4:
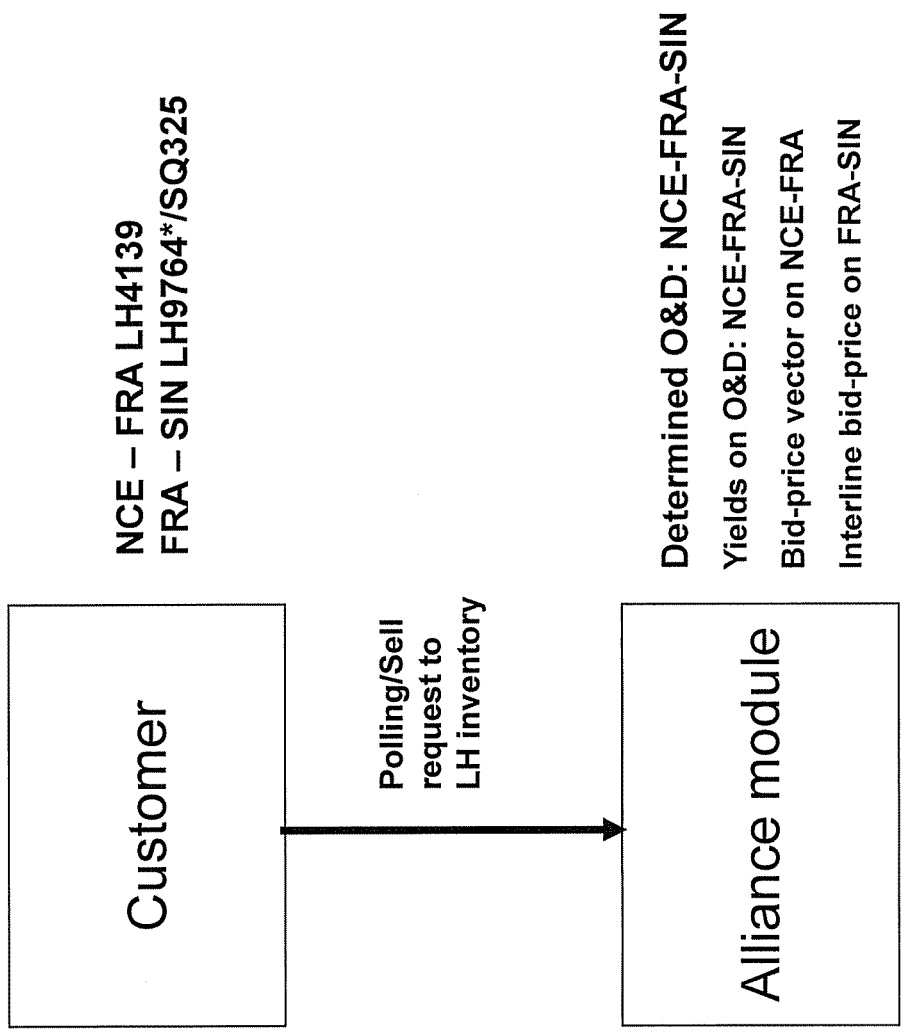

FIGS. 3a to 4 show examples of the booking process, in the specific case of an availability request, received for an airline using Bid Price information in its availability calculation algorithm.

As an example let's suppose LH and SQ are airlines, both members of the same Airline Alliance, and both hosted on the same Inventory system.

If a customer tries to book (for a specific date):
LH4139, Board Point: NCE, Off Point FRA;
SQ325, Board Point: FRA, Off Point SIN Then, an availability request must be sent to the inventory of LH airline.

The following steps need to take place in LH inventory system:
 Get the yield (net fare) for the origin-destination NCE-SIN;
 Get the bid-price (lowest price at which SQ airline is willing to sell a seat) on FRA-SIN;
 Calculate the effective yield on NCE-SIN by subtracting the bid-price of FRA-SIN to the OnD yield NCE-SIN;
 Calculate the availability on NCE-SIN for the effective yield.

FIGS. 3a and 3b show how state of the art systems would work to address the need of the example. In particular FIG. 3a illustrates a solution where the first airline (LH) dynamically accesses the other airline (SQ) inventory system to retrieve data required to complete the transaction. This solution has some drawbacks, e.g.: an interface needs to be put in place between the two airline inventory systems to exchange bid-price data; this interface would reflect latest bid-price on partner inventory system with some delay due to the time to transfer data; and it is not possible to lock seats on two remote inventory systems which might lead to overbooking situation.

FIG. 3b illustrates the solution of receiving "other airline" data directly from the "other airline" inventory system, on a regular basis, e.g. every night. This solution has the obvious drawback of possibly working on out of date data with all the troubles that this can cause to customers.

FIG. 4 shows which operations need to be done on the Alliance Module, once the availability/sell request reaches the Alliance Module.

Figure 5A:
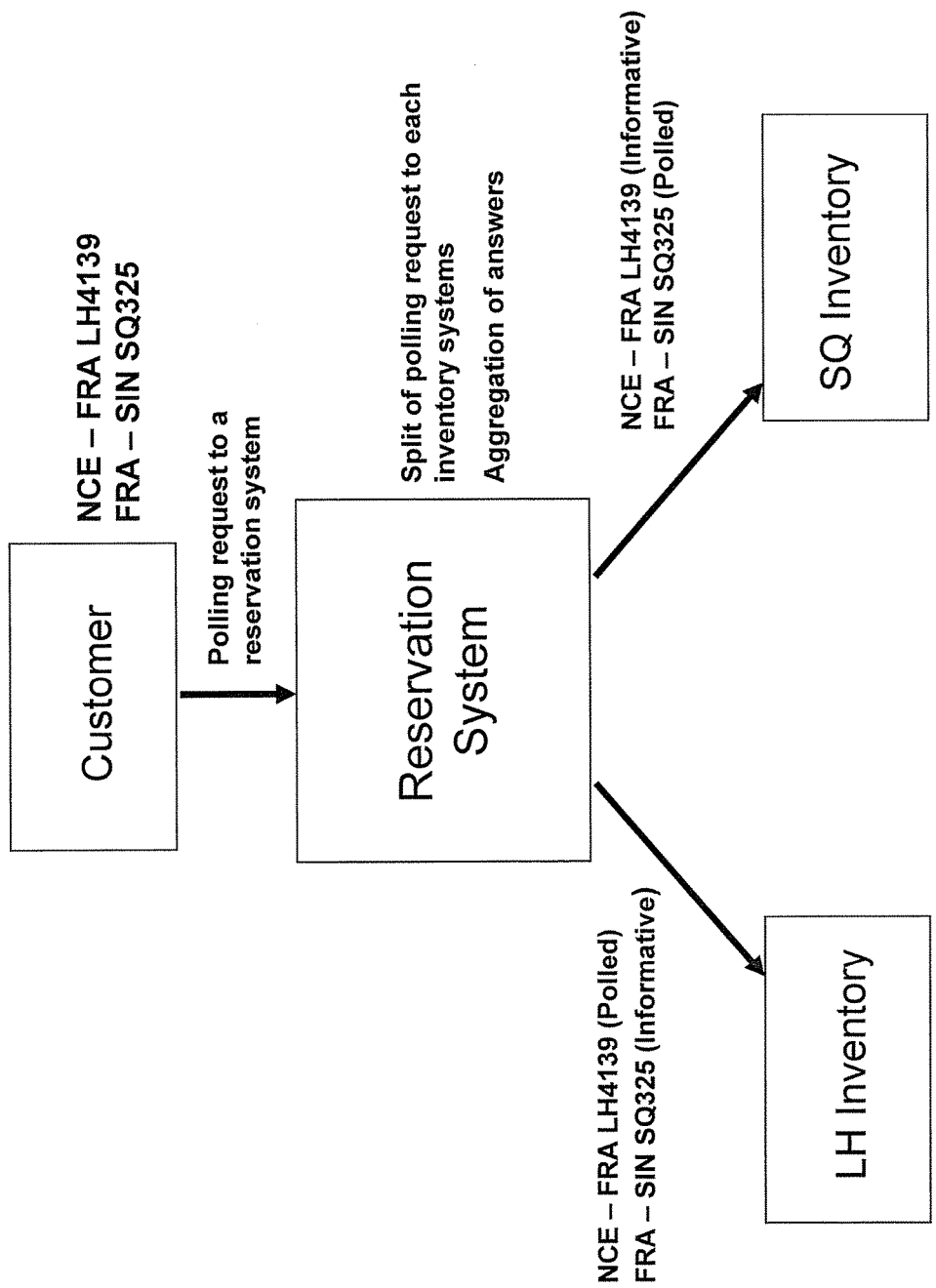

FIG. 5a shows the processing of a customer request according to the standard airline industry practice, where an availability request made of different airlines is actually split per airline, each sub-availability request being sent to the associated airline inventory system, and then answered thanks to the consolidation of each airline inventory system answer to the sub-availability request.

Figure 5B:
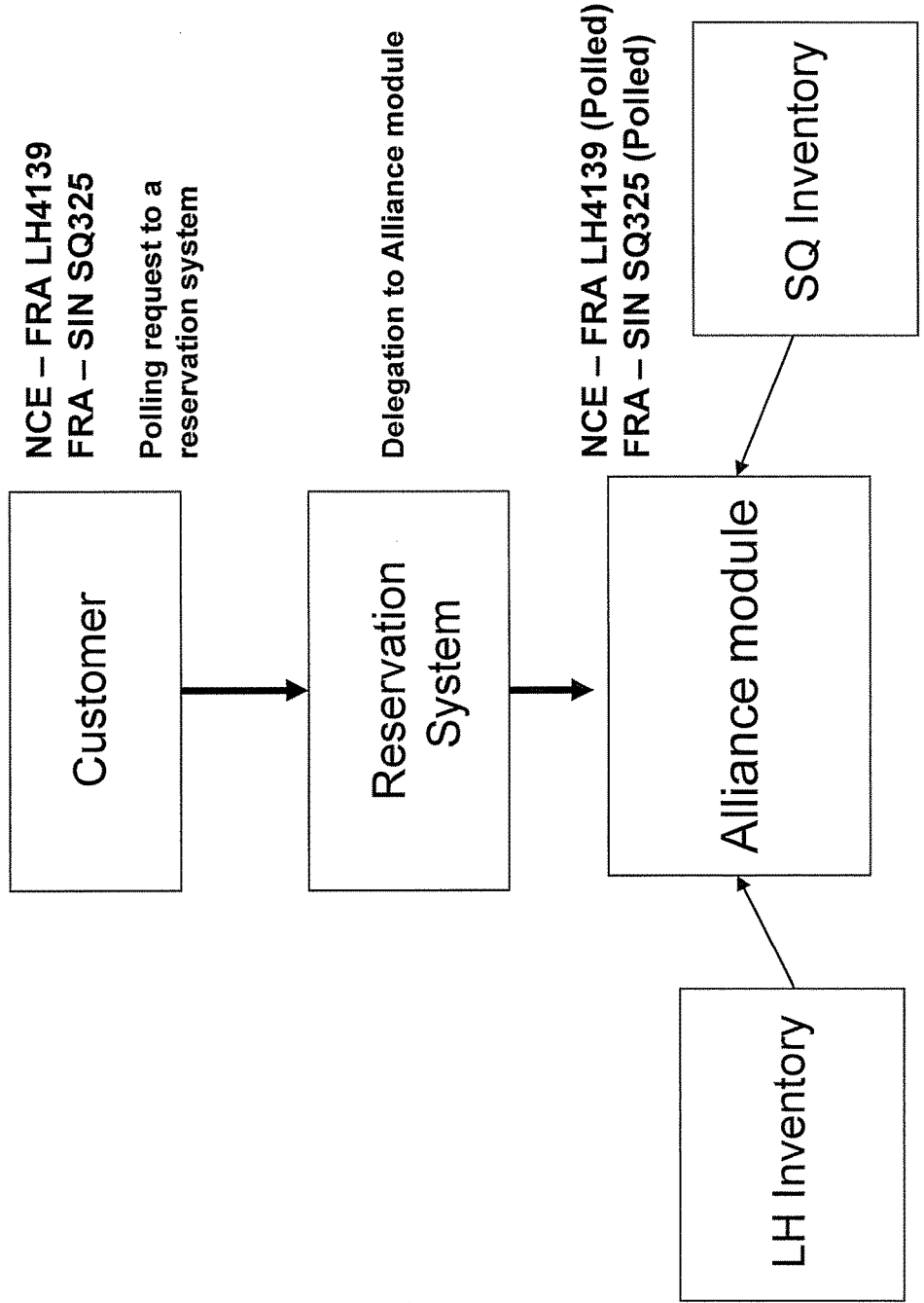
FIG. 5b shows the processing of a customer request according to a preferred embodiment of the present invention.

As shown in FIG. 5b the reservation process performed by a system according to a preferred embodiment of the present invention is represented. When the system detects a customer request asking for a flight reservation including multiple route components (in this example, Nice to Frankfurt and Frankfurt to Singapore) the request is forwarded to the Alliance Module, which takes care of the second step described above (i.e. "Get the bid-price (lowest price at which SQ airline is willing to sell a seat) on FRA-SIN") in a more efficient way; the security component will be checked for the permission of LH to retrieve the bid-price of the flight SQ325, and if granted, the SQ partition will be accessed to retrieve this bid-price, and use it in the following step.

In a preferred embodiment of the present invention, inventory data for hosted airlines are stored within Altéa Inventory in several, dedicated databases, one per airline (e.g. Oracle databases, but other Data Base Management Systems could be used instead).

Then, when an availability/sell request is received for one single airline (e.g. airline LH), the standard Altéa Inventory process takes place:

A database transaction is opened in a database associated with LH (read only for availability request/write for sell request);
 LH flights for which availability needs to be calculated, or on which seats need to be sold, are read from the database (a write lock is normally put on those flights in case of sell request to prevent any concurrent write access on those flights; deadlocks are prevented by locking the flights in a predetermined order);
 Additional inventory data, if applicable, is also retrieved from the database and potentially locked;
 Altéa Inventory functional process takes place (e.g. availability calculation . . . );
 If the whole process went fine, LH flights are updated in the database together with other potentially updated inventory data (in case of sell request), and the database transaction is committed; otherwise, the database transaction is roll-backed. In both cases, write locks are removed at the same time (in case of sell request).

Now, when an availability/sell request mixing several partner airlines is received for the "reference" airline LH, and after validating shared data thanks to the "permission" module, the following Alliance process takes place:

An applicative global transaction is opened across all the databases, made of a database transaction in the Oracle database associated to each airline sharing its data with LH (including LH): read only for availability request/write for sell request; it is to be noted that the global transaction is not managed by Oracle (or other DBMS), since several databases are impacted, but by the Alliance Module, thanks to the Altéa Inventory infrastructure.
 Flights for which availability needs to be calculated, or on which seats need to be sold, and on which LH is allowed to use data are read from the databases (and a lock is put on them in case of sell request etc.); at this stage, in case airline SQ has allowed airline LH to use data from its flights, the Alliance Module is using the real SQ flights data; for instance, in case a sell request is received in parallel by Altéa Inventory on the write-locked SQ flights, this sell request will wait for the release of the associated locks to be processed.
 Additional inventory data, if applicable, is also retrieved from the database and potentially locked;
 Alt éa Inventory functional process takes place, taking into account shared data from the other airlines for best quality (e.g. availability calculation);
 If the whole process went fine, flights are updated in the databases together with other potentially updated inventory data (in case of sell request), and the applicative global transaction is committed, meaning that all individual database transactions are committed; otherwise, the applicative global transaction is roll-backed, meaning that all individual database transactions are roll-backed. In both cases, Oracle write locks are removed at the same time (in case of sell request). Please note here the theoretical situation where some database transactions would fail to be committed, while some others would not.

This problem is a standard industry problem when dealing with distributed databases, solved for instance by using two phases commit methods (http://en.wikipedia.org/wiki/Two-phase_commit_protocol); the Alliance Module includes such a transaction coordination process linked to its applicative global transaction.

Figure 6:
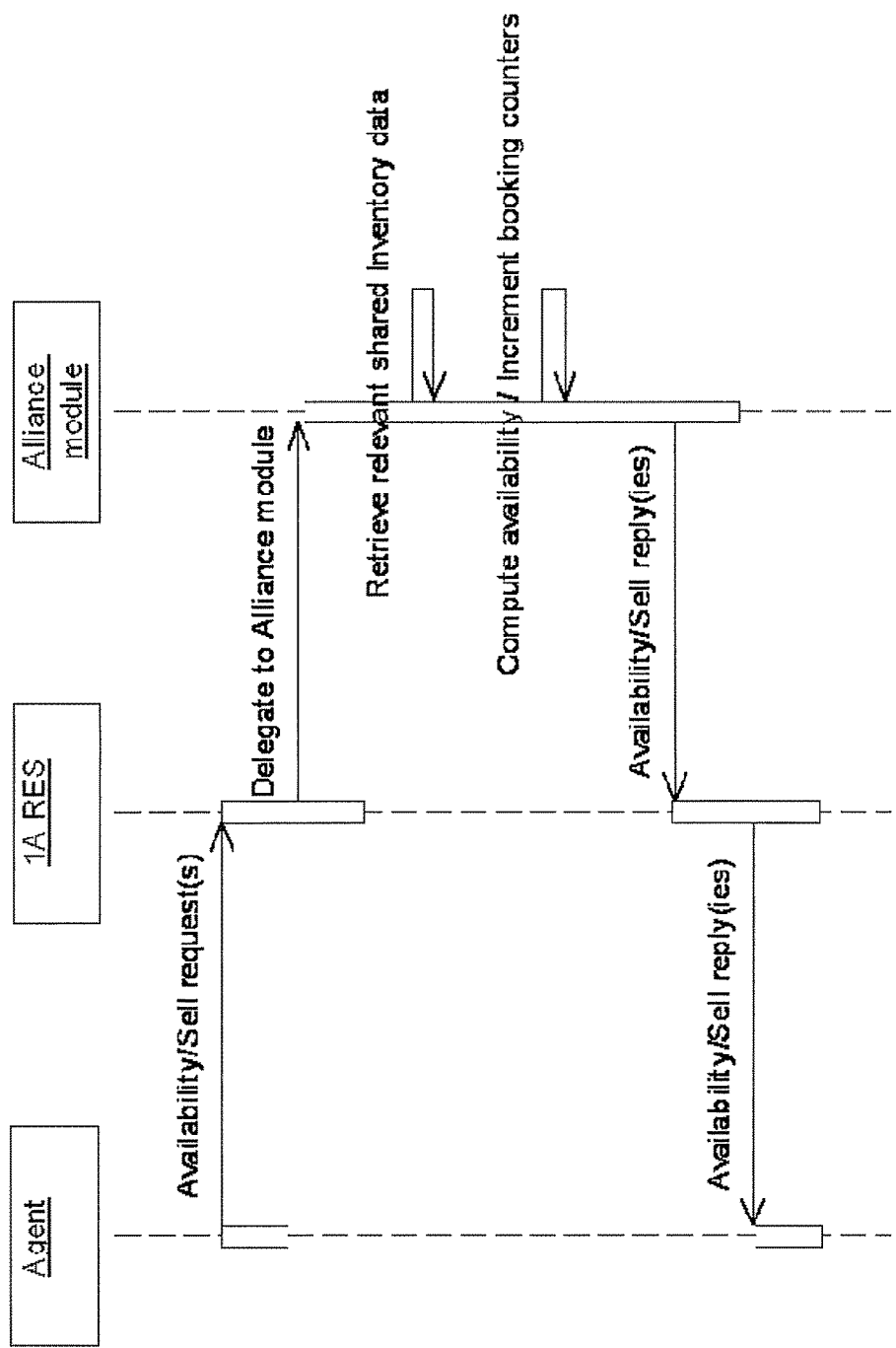
FIG. 6 is a diagram showing the flow of information according to one embodiment of the present invention.

As indicated in FIG. 6, the reservation/enquiry process implemented with a method according to a preferred embodiment of the present invention is composed by a sequence of related actions: a customer request requiring inventory data from some other airlines is detected on the airline Inventory system. For each other airline involved in the action that has been detected, a component holding access rules is queried to check whether the airline has the permission to access the other airline inventory data, and the precise data to which it has access. For each other airline involved in the action that has been detected and for which the airline has the permission to access inventory data, the airline Inventory system connects to the other airline partition, retrieve the required current other airline inventory data, and disconnects from the other airline partition. The action that has previously been detected is finally processed, taking into account all the other airline inventory data.

Figure 7:
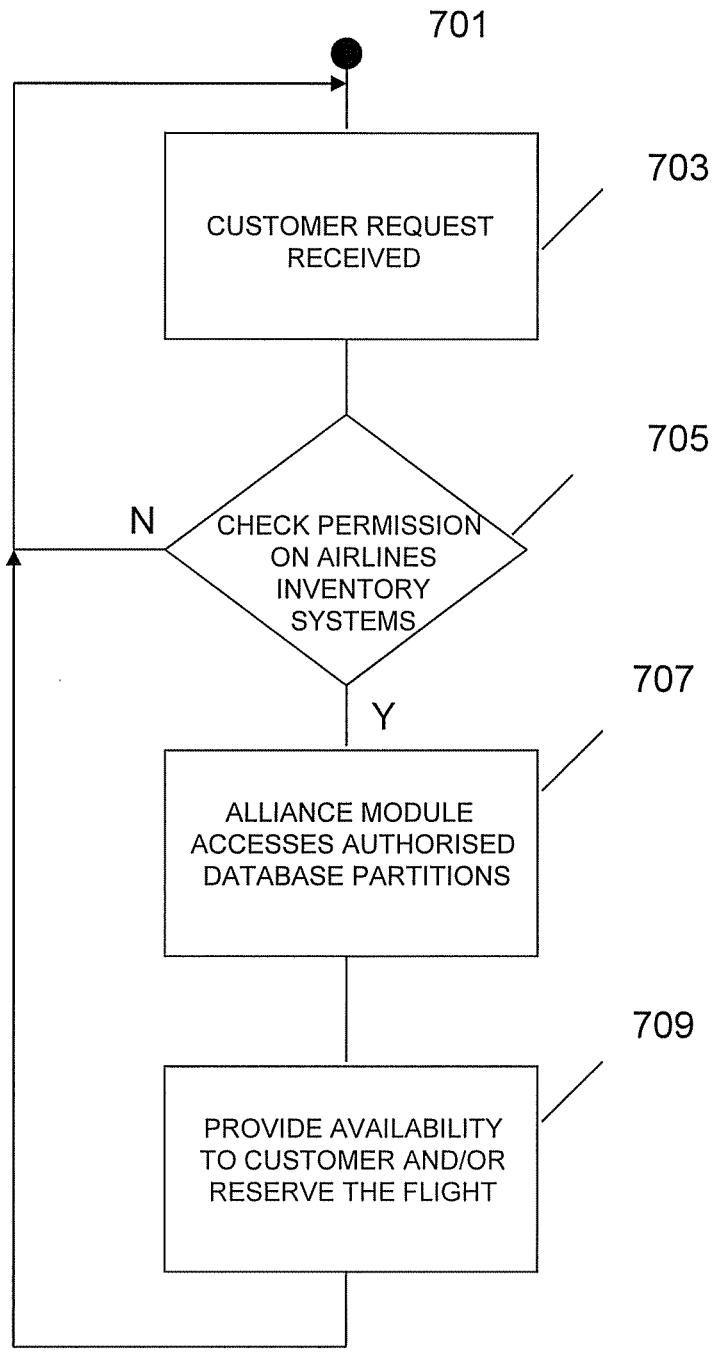
FIG. 7 is a flow chart of the method steps of a process, in accordance with one embodiment of the present invention.

The method described above is also represented in the diagram shown in FIG. 7. The method begins at black circle 701 and then goes to box 703 where a customer request is received. The system, through Alliance Module, performs a check to verify if its authorisations to access the various inventory partitions match with requirements of the customer's request; in other words, whether the necessary authorisations within the members of the alliance allow the handling of the customer request in a centralized way. The repository containing the access rules, i.e. all authorisations of each airlines belonging to the Alliance, is an important feature of the method according to a preferred embodiment of the present invention. On this repository the Alliance Module can find all necessary information for accessing another airline data base (or a data base partition) and checks (705) whether the available authorisations allow the handling of the customer request. As mentioned above the Access Rules repository can be modified and maintained to reflect the up to date status of the relationships and agreements among the various airlines of the Alliance. If the access (and the required operation) is not possible, the customer's request will be addressed in alternative manners (e.g. if a request for NCE-FRA (LH) connected to FRA-SIN (SQ) is done by a user and if there is no agreement between airline LH and airline SQ on the route between Europe and Asia, then the individual requests are sent to LH and SQ as it happens with state of the art reservation systems). If the required accesses are possible, the Alliance Module checks availability of seats and obtains information on best price options to satisfy customer's request (box 707). Those skilled in the art will appreciate that this step can be implemented and customized in several different ways, according to the customers' and/or airlines (or airlines alliance) interests. Various parameters can be taken into account in this phase, e.g. best total price for the customers, most convenient coincidence combinations, best exploitation of available seats and so on. Also it is equally possible to make a complex calculation with several parameters combined together in a total formula with different weights applied to each parameter according to e.g. an administrator's tuning activity. As mentioned above this access to the various partitions is performed in real time. The characteristics will be implemented thanks to dynamic business rules managed by an administrator (e.g. an airline alliance representative), and the real time access to the various partitions will be guaranteed by the usage of a distributed database transaction coordinator able to access the underlying inventory databases of all the airlines hosted by the Alliance Module in order to provide the customers with an immediate answer to their request. At box 709 such answer is issued to the customer and can be in the form of simple availability information or a proper reservation, if this is what was indicated in the request. This activity as well, can be implemented in many different ways, according to the needs of the system administrator.

It will be appreciated that alterations and modifications may be made to the above without departing from the scope of the disclosure. Naturally, in order to satisfy local and specific requirements, a person skilled in the art may apply to the solution described above many modifications and alterations. Particularly, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

In any case, the solution according to the present disclosure lends itself to be carried out with a hardware structure (for example, integrated in a chip of semiconductor material), or with a combination of software and hardware.

What is claimed is:

1. A method for managing a plurality of flight inventory databases each associated with one of a plurality of airlines, the method comprising:

receiving, at a server from a reservation client module of a first airline, a first customer request to access a flight inventory database of a second airline;

querying, by the server, a repository of access rules to retrieve first access rules defining a partition of the flight inventory database of the second airline that can be accessed by the first airline;

verifying, by the server, whether the first access rules authorize the first airline to access a portion of data in the flight inventory database of the second airline that is necessary to satisfy the first customer request;

responsive to the authorization being verified, connecting, by the server, to the partition of the flight inventory database of the second airline;

retrieving, by the server, the portion of data from the partition of the flight inventory database of the second airline;

transmitting, by the server, the portion of data retrieved from the partition of the flight inventory database of the second airline to the reservation client module of the first airline; and disconnecting, by the server, from the partition of the flight inventory database of the second airline.

2. The method of claim 1 further comprising:

while the server is connected to the flight inventory database of the second airline to retrieve the portion of data, locking the portion of data of the flight inventory database of the second airline to prevent concurrent write access by the reservation client module of any other airline of the plurality of airlines.

3. The method of claim 1 wherein the plurality of airlines are members of the same airlines alliance.

4. The method of claim 1 wherein the first access rules include authorized operations that can be performed on each portion of data.

5. The method of claim 4 further comprising:

responsive to the server retrieving the portion of data of the flight inventory database of the second airline, allowing the reservation client module of the first airline to perform the authorized operations on the portion of data.

6. The method of claim 5 wherein the authorized operations include checking availability of a flight.

7. The method of claim 5 wherein the authorized operations include reserving a flight.

8. A computer program product for managing a plurality of flight inventory databases each associated with one of a plurality of airlines, the computer program product comprising a non-transitory computer readable medium including program code configured to, when executed by a computer, cause the computer to:

receive, from a reservation client module of a first airline, a customer request to access a flight inventory database of a second airline;

query a repository of access rules to retrieve access rules defining a partition of the flight inventory database of the second airline that can be accessed by the first airline;

verify whether the access rules authorize the first airline to access a portion of data in the the flight inventory database of the second airline that is necessary to satisfy the customer request;

responsive to the authorization being verified, connect to the partition of the flight inventory database of the second airline;

retrieve the portion of data from the partition of the flight inventory database of the second airline;

transmit the portion of data retrieved from the partition of the flight inventory database of the second airline to the reservation client module of the first airline; and disconnect from the partition of the flight inventory database of the second airline.

9. A data processing system for managing a plurality of flight inventory databases each associated with one of a plurality of airlines, the system comprising:

a server including at least one processor, a repository of access rules defining partitions of flight inventory databases of airlines that can be accessed by a first airline, and program code configured to be executed by the at least one processor and upon execution to cause the server to:

receive, from a reservation client module of the first airline, a first customer request to access a flight inventory database of a second airline;

query the repository to retrieve first access rules defining a partition of the flight inventory database of the second airline that can be accessed by the first airline;

verify whether the first access rules authorize the first airline to access a portion of data in the flight inventory database of the second airline that is necessary to satisfy the first customer request;

responsive to the authorization being verified, connect to the partition of the flight inventory database of the second airline;

retrieve the portion of data from the partition of the flight inventory database of the second airline;

transmit the portion of data retrieved from the partition of the flight inventory database of the second airline to the reservation client module of the first airline; and disconnect from the partition of the flight inventory database of the second airline.

10. The computer program product of claim 8 wherein the program code further causes the computer to:

while connected to the partition of the flight inventory database of the second airline to retrieve the portion of data, lock the portion of data to prevent concurrent write access by the reservation client module of any other airline of the plurality of airlines.

11. The computer program product of claim 8 wherein the access rules include authorized operations that can be performed on each portion of data, and the program code further causes the computer to:

responsive to retrieving the portion of data of the flight inventory database of the second airline, allow the reservation client module of the first airline to perform the authorized operations on the portion of data.

12. The data processing system of claim 9 wherein the program code is configured to cause the server to:

while connected to the flight inventory database of the second airline to retrieve the portion of data, lock the portion of data of the flight inventory database of the second airline to prevent concurrent write access by the reservation client module of any other airline of the plurality of airlines.

13. The data processing system of claim 9 wherein the plurality of airlines are members of the same airlines alliance.

14. The data processing system of claim 9 wherein the first access rules include authorized operations that can be performed on each portion of data.

15. The data processing system of claim 14 wherein the program code is configured to cause the server to:

responsive to retrieving the portion of data of the flight inventory database of the second airline, allow the reservation client module of the first airline to perform the authorized operations on the portion of data.

16. The data processing system of claim 14 wherein the authorized operations include checking availability of a flight.

17. The data processing system of claim 14 wherein the authorized operations include reserving a flight.

18. The method of claim 1 further comprising:

receiving, at the server from a reservation client module of the second airline, a second customer request to access a flight inventory database of the first airline;

querying, by the server, the repository of access rules to retrieve second access rules defining a partition of the flight inventory database of the first airline that can be accessed by the second airline;

verifying, by the server, whether the second access rules authorize the second airline to access a portion of data in the flight inventory database of the first airline that is necessary to satisfy the second customer request; and responsive to the authorization being verified, connecting, by the server, to the partition of the flight inventory database of the first airline.

19. The data processing system of claim 9 wherein the program code is further configured to cause the server to:

receive, from a reservation client module of the second airline, a second customer request to access a flight inventory database of the first airline;

query the repository of access rules to retrieve second access rules defining a partition of the flight inventory database of the first airline that can be accessed by the second airline;

verify whether the second access rules authorize the second airline to access a portion of data in the flight inventory database of the first airline that is necessary to satisfy the second customer request; and responsive to the authorization being verified, connect to the partition of the flight inventory database of the first airline.

\* \* \* \* \*